UNITED STATES PATENT OFFICE.

ALBERT DECATUR BARR, OF JERSEY CITY, NEW JERSEY.

CATALYTICALLY-ACTING ENZYMIC AGENT AND PROCESS OF PRODUCING IT.

1,051,061.     Specification of Letters Patent.     Patented Jan. 21, 1913.

No Drawing.     Application filed March 18, 1909. Serial No. 484,267.

*To all whom it may concern:*

Be it known that I, ALBERT DECATUR BARR, a citizen of the United States, residing at Jersey City, in the county of Hudson and State of New Jersey, have invented new and useful Improvements in Catalytically-Acting Enzymic Agents and Processes of Producing Them, of which the following is a specification.

This invention relates to the production of catalytically acting enzymic agents of high activity, and in many cases of a different type of activity, from the natural enzymic proteid bodies, or unorganized ferments, such as pepsin, by subjecting such bodies to the successive action of alkali and acid strong enough to change the molecular structure.

An important part of my invention is the discovery that it is possible to split these proteids along a line of cleavage different from those heretofore known and resulting in a chemical change of the proteid molecule. Heretofore it has been supposed that proteids generally can be split mainly along two lines of cleavage, producing either peptones and amino products or putrefactive substances. I have discovered that by following the process herein set forth these proteids can be made to split along another line of cleavage, producing a different molecular structure, and that by so treating such an enzymic proteid it is prevented from splitting along the usual lines above referred to and is caused to split along a different line whereby a catalytically acting or enzymic agent of great power and value is obtained. For example, in the case of pepsin, the proteolytic action is suppressed and the product possesses a sugar-splitting action.

So far as I am aware, no suggestion has heretofore been made that it is possible to produce a proteid enzymically acting agent except by the complex processes of living cells. For this complex process I substitute a simple chemical change, obtaining thereby novel catalytically acting agents or enzymes substantially as effective and powerful as those resulting from the more complex processes of the living cells.

The method by which I give effect to my discovery consists in subjecting the enzymic proteid substance first to alkali and then to acid of strengths sufficient to produce a molecular cleavage. The proteid substance may be subjected to acid and then alkali and then acid and other variations may be made if desired; but the essential idea is the treatment with alkali followed by the treatment with acid, and additional treatments before or after these two steps are of subordinate importance in the process.

The particular kind of alkali and the particular kind of acid are not of controlling importance, any kinds answering the purpose provided they are strong enough to change the molecular structure of the proteid. But because, being volatile, it is practicable to separate it more easily, ammonia is the most convenient alkali and is used in the illustrative formula hereinafter given. Perhaps the next most convenient alkali for the purpose is a watery solution of an alkaline compound of sodium or potassium, and any sufficiently strongly alkaline compound will answer. Acetic acid is mentioned as the acid in the illustrative formula. Probably the next most convenient acid is hydrochloric acid, but any sufficiently strong acid will answer the purpose.

It is thus apparent that the invention consists essentially in the production of a catalytic or enzymic agent by subjecting an enzymic proteid substance to an alkali and then to an acid.

The following is an illustrative formula which may be varied by substituting other enzymic proteid substances or substances containing proteids, other alkalis, or other acids, and widely modifying the periods and manner of application without departing from the spirit or scope of my invention. Take, say, one pound of pepsin (U. S. P.), thoroughly saturate it with stronger ammonia water (U. S. P.), making the saturation thorough in any convenient way, as, for example, by operating in the manner in which fluid extracts are usually made. Place the whole in a percolator, and add stronger ammonia water until a stratum remains above. Tightly close the percolator, including the lower orifice. Allow it to remain, say, twenty-four (24) hours. Evaporate the ammonia, preferably at a temperature not exceeding 125° F. Place the product again in the percolator. Thoroughly saturate with acetic acid. Add sufficient acetic acid for a stratum to remain above. Tightly close the percolator as before. Allow maceration to proceed for, say, five (5) days, though the full period is not necessary to obtain a more or less complete conversion. Evaporate the acetic acid, preferably at a temperature not exceeding 125° F.

The product is a brown, amorphous powder having a mild acidulous or slightly saline taste which attracts moisture when exposed to the air, is soluble for the most part in about one hundred parts of water, with more or less opalescence, and is insoluble in alcohol, ether or chloroform. On heating a solution in acidulated water to 212° F. it becomes milky or yields a light precipitate. It has a slight acid reaction. On admixture with substances capable of undergoing a hydrolytic change, the new composition produces hydrolytic changes.

As has been pointed out, the formula given is for purposes of illustration. The process consists in the subjecting of enzymic proteids successively to alkali and acid.

I claim:—

1. A process of manufacturing catalytic agents which consists in saturating an enzymic proteid substance with alkali and saturating the resulting product with acid, the acid and alkali being of sufficient strength to effect a molecular cleavage of such proteid.

2. A process of manufacturing catalytic agents which consists in applying alkali to an enzymic proteid substance and applying an acid to the resulting product, the acid and alkali being of sufficient strength to effect a molecular cleavage of such proteid.

3. A process of manufacturing catalytic agents which consists in saturating pepsin with stronger ammonia water, evaporating, saturating the resulting product with acetic acid, and evaporating.

4. As a new composition of matter, an enzymically acting catalytic agent of proteid nature and having the composition of an acid and alkaline cleavage product of an enzymic proteid, and having an enzymic power different from that of the original enzymic proteid.

ALBERT DECATUR BARR.

Witnesses:
 HERMAN GUSTOW,
 KATHRYN M. KILEY,